United States Patent [19]
Adams

[11] 3,778,169
[45] Dec. 11, 1973

[54] OPTICAL ALIGNMENT TARGET APPARATUS

[75] Inventor: Larry D. Adams, Collingswood, N.J.

[73] Assignee: Metrologic Instruments Inc., Bellmawr, N.J.

[22] Filed: Feb. 26, 1973

[21] Appl. No.: 335,500

[52] U.S. Cl.............. 356/172, 33/293, 350/299, 356/153
[51] Int. Cl...... G02b 5/16, G01d 7/06, B01b 11/26
[58] Field of Search.................. 350/299; 356/153, 356/172

[56] References Cited
UNITED STATES PATENTS
3,551,057   12/1970   Hamilton et al.............. 358/172
3,599,336   8/1971    Walsh........................ 356/172

*Primary Examiner*—Ronald L. Wibert
*Assistant Examiner*—S. R. Morrison
*Attorney*—Henry N. Paul, Jr. et al.

[57] ABSTRACT

An alignment target for use with a collimated light source, comprising a disc of translucent material with a 45° annular surface around the center thereof, which surface receives light directed perpendicular to the disc and directs it radially outward by scattering, refraction or reflection toward passive light indicators spaced circumferentially around the outer portion of the disc. In use of the target, a light source such as a laser is directed upon the disc, and any misalignment of the laser results in a light indication from specific ones of the passive light indicators corresponding to the angle of misalignment, enabling the operator to realign the laser until it is centered within the counterbore of the target.

13 Claims, 11 Drawing Figures

PATENTED DEC 11 1973 3,778,169

OPTICAL ALIGNMENT TARGET APPARATUS

BACKGROUND OF THE INVENTION

1. Field of the Invention

This invention lies in the field of passive light targets and, particularly, passive light targets for use in aligning collimated light beams such as lasers.

2. Description of the Prior Art

With the advent of the laser as a commercially available piece of equipment, there have come into being a great number of uses for lasers, industrial, educational and otherwise, wherein the laser beam is directed over a relatively great distance toward a specifically positioned target. One of the difficulties encountered in such laser uses is in aligning the laser so that its light beam is directed precisely at and on the target, be the target fixed in position or (as in certain industrial uses) moving. For example, in the case of the fixed position target, the laser operator may have appreciable difficulty in knowing, with any precision, when the laser beam is properly aligned on a target which may be approximately 100 yards distant.

A number of prior art techniques have been developed for aligning lasers with respect to distant targets. A simple and reliable procedure is to have a second person positioned at the target, which second person watches the location of the beam on the target and signals the operator, either by hand signals or radio communication, and thus informs the laser operator as to how to position the beam for proper alignment. This method, although reliable, is attended by the disadvantage that the person at the target may have difficulty in expressing his directions and by the fact that the laser operator in turn may have difficulty in interpreting such directions properly. Further, the procedure has the obvious disadvantage of requiring a second person.

A second procedure in use is that of providing the laser operator with a sighting telescope, or other equivalent optical device. Using this technique, the operator first centers his sighting telescope on the target, and then adjusts the beam until it is centered on the target, periodically checking to see that he is moving the beam in the proper direction. This method has the advantage of enabling the laser operator himself to monitor the alignment, rather than working "blind," and requires only one person. However, it does have the disadvantage of requiring a second piece of relatively expensive equipment, and introduces an amount of error commensurate with the lack of resolution with which the operator can accurately see the position of the laser beam on the target.

A third technique for aligning a laser is to use an active, photosensing type of target. An example of this type of target is a quadrant-type detector, having four electrically isolated detectors positioned in quadrants about the center of a target, each of which is connected to an amplifier and electrical processing circuity for electrically determining whether the beam is out of alignment, and if so, toward which quadrant it is biased. The operator adjusts the laser beam until the electrical output is nulled, indicating proper alignment. While an extremely high degree of accuracy may be attained with this procedure, it is obvious that it requires a relatively expensive and elaborate sensing system. This method, particularly if it includes a self-aligning servo system, involves an expense which is highly disproportionate compared to the expense of the laser itself.

It is thus seen that, in view of the prior art alignment systems, there is a considerable need for an optical alignment target which is inexpensive, reliable and accurate, and which enables a single operator to efficiently align a laser beam, or a collimated light beam from whatever source, on a distant target.

SUMMARY OF THE INVENTION

It is a primary object of this invention to provide an inexpensive and easily utilized optical target with which a single operator can accurately align a laser beam.

It is a further object of this invention to provide a means for aligning a collimated light source on a distant target which can be operated by a single operator and without the need of any equipment other than the laser and the target itself.

It is a further object of this invention to provide an extremely sensitive and easily operated optical target which may be utilized in a passive state or adapted to provide active signals from which a target control signal may be derived.

In accordance with the above objectives, there is provided an optical target in the form of a translucent disc having a hole drilled in the center thereof and a 45° annular surface around same such that light perpendicular to the target and striking the 45° surface is refracted and/or reflected radially outward to the outer edge of the target. The target contains, around its outer edge, a circumferentially placed and uniformly spaced light-diffusing plugs which, when struck by light directed outward by the annular surface, diffuse such light and provide a light indication. In other embodiments, optical fibers are used to direct the received light back in the direction toward the laser beam source. An automatic control signal may be derived by positioning photodetectors around the circumference, and processing the photodetector signals to derive a light beam position signal.

DESCRIPTION OF THE PREFERRED EMBODIMENTS

Figures 1A, 1B:
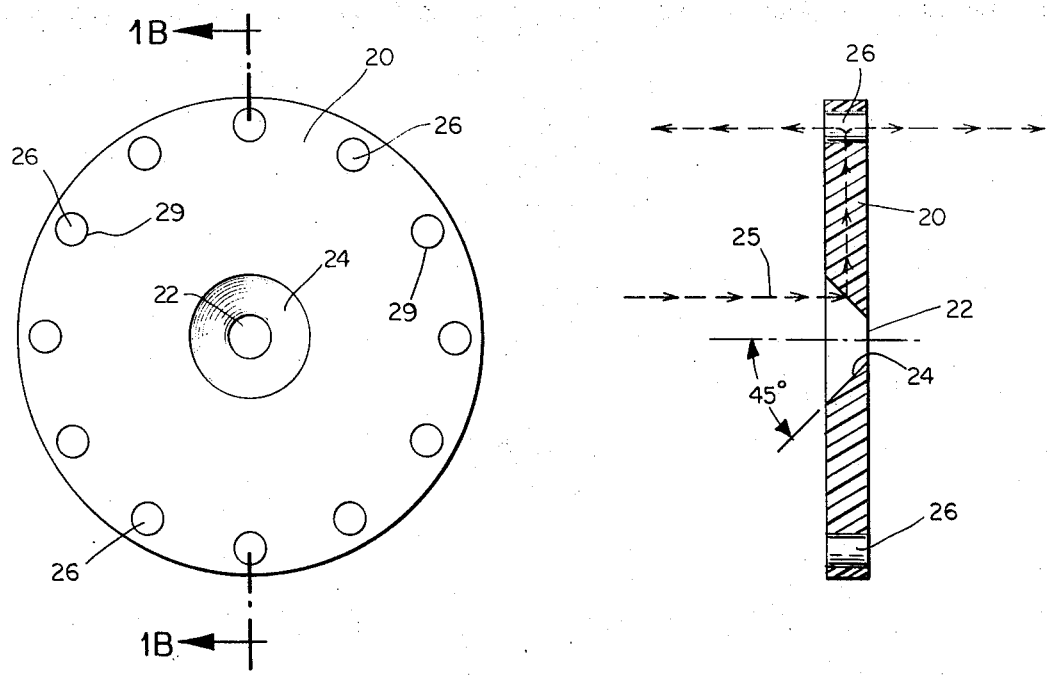
FIG. 1A is a front view of a target according to this invention, looking perpendicularly at the target from the direction of a light source which is directed toward the target.
FIG. 1B is a section, taken along line 1B—1B as seen in FIG. 1A.

Referring now to the illustration of FIG. 1, there is shown a front view of a disc, preferably cast of a clear acrylic sheet, suitably one-fourth inch thick. The desired property of the acrylic material is that it is clear and can transmit light with relatively little diffusion. The property, for purposes of this specification and the following claims, is referred to as translucence, and the meaning of the term as used herein is elaborated upon by the following explanation of embodiments.

The translucent disc 20 contains an opening, or aperture 22 through the center thereof, around which is drilled at 45° counterbore 24. The counterbore is preferably polished to provide a smooth surface. The optical properties of the acrylic are such that when a collimated beam of light, such as produced by a laser, is directed perpendicular to the target face and strikes the 45° counterbore surface, it is refracted through the acrylic radially outwardly toward the circumference of the disc, as illustrated by dashed line 25 in FIG. 1B. Around the circumference of the disc are positioned openings or holes 29 drilled in the acrylic, the inside surfaces of which preferably are also polished. The holes are filled with light-diffusing plastic plugs 26 which are inserted and tightly fitted into the holes. The refracted light strikes the plug or plugs 26 which are closest to that portion of the counterbore 24 on which the light beam is positioned. Such refracted light diffuses through the plug material, causing it to light up so that it can be clearly distinguished at a distance.

Figures 2A, 2B:
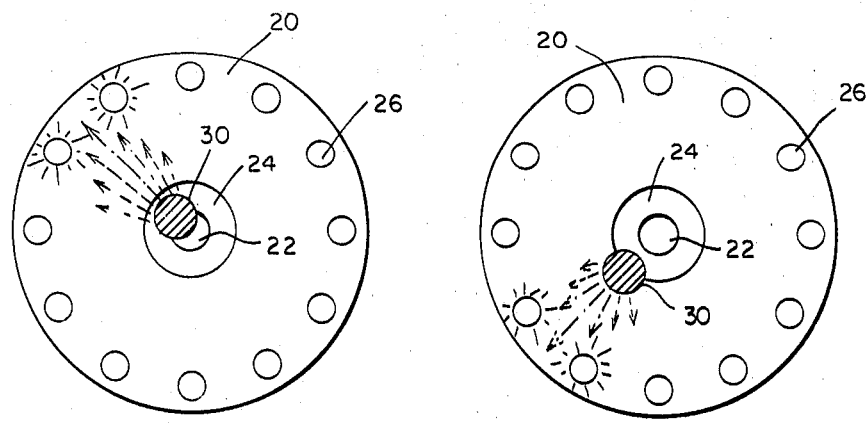
FIG. 2A is an illustration of the light indication provided by the target of FIG. 1A when a collimated light beam is positioned slightly above and to the left of the center of the target.
FIG. 2B is an illustration of the light indication provided by the target of FIG. 1A when a collimated light beam is positioned to the lower left of the center of the target.

The use of the target is further illustrated in FIGS. 2A and 2B. In FIG. 2A, a light beam 30 is shown diagrammatically as striking the target just above and slightly to the left of the target center. As illustrated, part of the light beam falls on the counterbore surface, resulting in refraction of light outward as indicated by the arrows. The relative intensity of the light transmitted in each radial direction depends, of course, on the amount of the light beam falling on the counterbore at any given radial direction. In the illustration of FIG. 2A, the light beam is positioned above and slightly to the left of the center, such that, for a 12 plug target, plugs corresponding to clock positions 10 and 11 transmit light which can be seen from the viewer positioned at the laser source. The lengths of the dashed arrows schematically depict distribution of refracted light intensity. In FIG. 2B, the light beam is positioned below and to the left, or approximately at a 7:30 position. Correspondingly, the refracted light is directed out such that plugs at the 7:00 and 8:00 o'clock positions are lit.

It is to be noted from the above examples that, in order to obtain resolution of the misalignment of the laser beam, that the counterbore area 24 must be at least as large as the light beam itself. For the case where the diameter of the counterbore is equal to the diameter of the light beam, the aperture diameter is then equal to one half the beam diameter. In utilizing the alignment device, the operator simply recognizes which plugs are lit, and adjusts the beam accordingly. With 12 plugs positioned around the circumference of the target, there will almost always be at least two plugs visible for any misalignment, such that the operator can determine which way to move the beam. When the beam is substantially centered, all of the plugs will be lit with substantially equal intensity.

In view of the above discussion, the desired optical characteristics of both the disc and the plugs is more readily understood. For example, it is clear that, in order for the operator to be able to accurately determine the direction of beam offset, the plugs (or passive indicators) must be more light-diffusive than the disc itself. Ideally, the disc transmits the refracted light without any diffusion, or spreading, so that the disc itself does not light up. Of course, it is appreciated that practically the disc need not be diffusion free, so long as it transmits or disperses sufficient light to the circumferential area where the plugs are. For this purpose, any light-transmitting plastic is suitable. The plugs, in turn, must have a high-diffusion characteristic, so that they disperse enough light so as to appear to light up. As such, the plug material must be light-diffusing, such as a white pigmented plastic.

It is to be noted that the disc need not be circular in form, and the term disc as used herein is not so limited. Similarly, the plugs, or light indicators 26 may be of different forms. Indeed, the openings 29 when left unplugged transmit light from their inner surfaces. Yet another technique is that of mounting, at appropriate angles, mirrors in openings 29, to direct light back toward the source. As used in the claims, the term "light indicator" thus embraces any equivalent passive indicator located at or about the periphery of the disc, or displaced radially from the disc center.

Figures 3A, 3B:
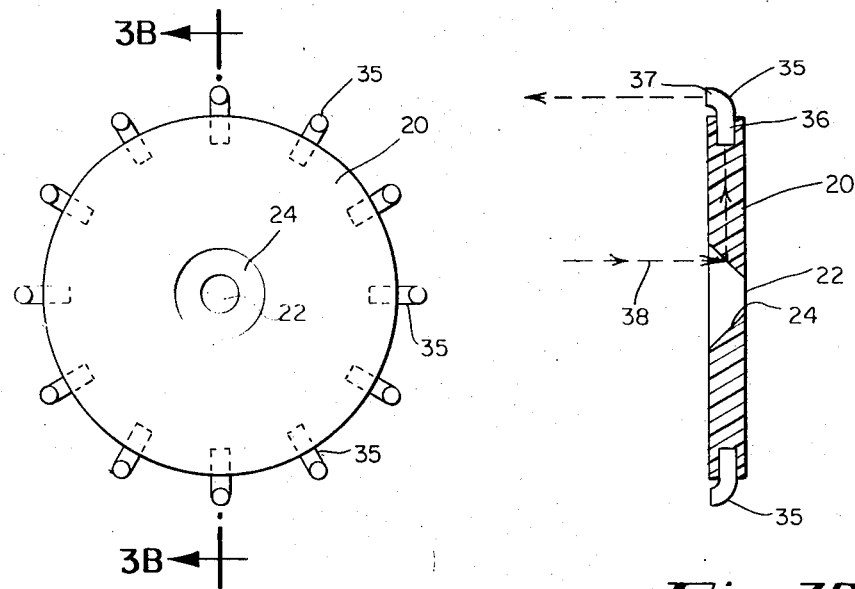
FIG. 3A is a front view of an alternate embodiment of the target of this invention comprising optical fibers.
FIG. 3B is a section, taken along line 3B—3B as seen in FIG. 3A.

Referring now to FIG. 3, there is shown an alternate embodiment of the target of this invention. In this embodiment, the plugs are replaced with optical fibers 35 which are inserted into the outer periphery of the disc, each fiber being bent at 90° and having a first portion 36 aligned radially with the center of the target, and a second portion 37 directed perpendicular to the target. In the use of this target, light striking the counterbore, as indicated by arrow 38, is refracted and transmitted radially outward where it is picked up by first member 36 of the fiber 35. The fiber conducts the light around a 90° bend, and transmits it back toward the original light source, as indicated. It is understood, of course, that the advantage of this embodiment is that the fibers are an efficient means of directing the light back toward the target, providing better indication of the light beam position on the target. However, as in the case of the previous embodiments, it is noted that the target is entirely passive, requiring no power or instrumentation of any sort.

Figure 4A:
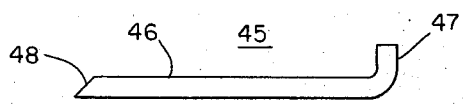
FIG. 4A is a sketch of an optical fiber section.
Figure 4B:
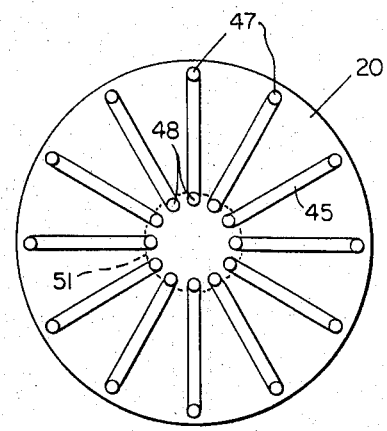
FIG. 4B is a front view of an alternate embodiment of the target of this invention comprising optical fibers.

Referring now to FIGS. 4A and 4B, there is shown another embodiment of this invention. In this embodiment, the target is fabricated from a plurality of optical fiber sections 45 as shown in FIG. 4A, each having a long portion 46 and a short portion 47 at right angles thereto. Portion 46 is terminated in a 45° polished end 48. As is seen in FIG. 4B, a plurality of fiber sections 45 are arranged to point radially outward from the center of the target 20, with the beveled ends 48 positioned adjacent the center and the short ends 47 positioned outward from the center. The optical fibers may be thus positioned on a suitable flat disc and adhered thereto with a suitable adhesive. The outer edges of the angled surfaces 48 of the fibers define a circle, as shown by the dotted line at 51, which corresponds to the outer edge of the counterbore 24 in FIG. 1A. The circle of surfaces 48 constitutes a bevelled annular surface in the same manner as does counterbore 24. In this embodiment, when the beam falls within circle 51, light will be transmitted to the end 49 corresponding to each surface 48 struck by the beam. Thus, if the beam is of the same size as circle 51, and is precisely centered, each fiber 45 will transmit back toward the viewer a light signal of equal intensity. If the beam is displaced in any direction from the center, certain of the surfaces 48 will not receive light, and corresponding ends 49 will not be seen to transmit any light, such that the operator can discern the misalignment by determining which fibers around the circle are transmitting light.

Figure 5:
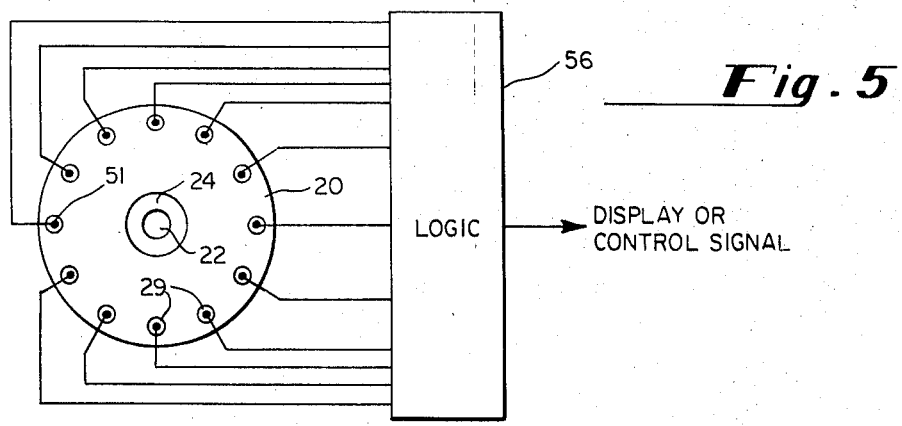
FIG. 5 is a schematic diagram of a target according to this invention in combination with logic means for generating a control signal.

To illustrate the adaptability of the target of this invention to more automated uses, there is shown in FIG. 5 a schematic diagram of a target similar to that shown in FIG. 1A, but where there are positioned within the openings 29 solid state light detecting devices 51, such as phototransistors. Each such light detecting device produces an electric signal output, which is communicated to a logic element 56, which element analyzes the input lines, determines which ones indicate detection of light, and generates an electrical signal which may be transmitted to a remote display unit, or which may be used as a control signal in a servo system for adjusting either the position of the target itself, or the alignment of the light source. Thus, the target may be mounted upon a moving object which is to move along a line precisely defined by a laser beam, and any time the target deviates from the line, a control signal is generated in logic element 56, which control signal is used to readjust the position of the device carrying the target. It is thus seen, by this illustration, that the passive target of this system may also be adapted for use in active alignment procedures.

Figure 6A:
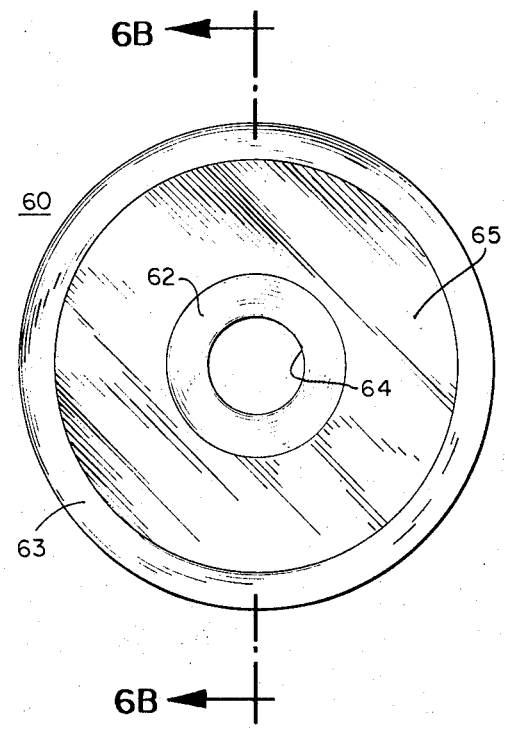
FIG. 6A is a front view of an alternate embodiment of the target of this invention having an annular cone around the center thereof.
Figure 6B:
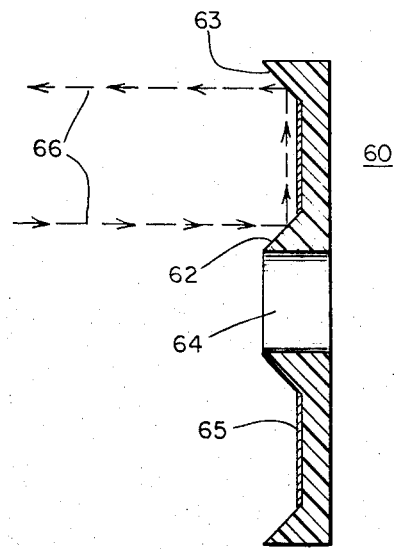
FIG. 6B is a section, taken along line 3B—3B as seen in FIG. 3A.

Referring now to FIGS. 6A and 6B, there is shown an embodiment of the target of this invention wherein the annular surface around the center represents a truncated cone, rather than a counterbore. The beveled surface 62, preferably at a 45° angle, is made reflective by polishing or coating same with a mirror surface. At the outer periphery of the target 60, there is another beveled surface 63, also suitable at a 45° angle, which is also made to be reflective. As indicated by the dashed line designated by the numeral 66, light which is perpendicular to the target 60 and incident upon surface 62 is reflected to and off 63, and thereby returned to the source of the light. Thus, by having a beveled surface 62 surrounding an opening 64, the path followed by the light may be made essentially the same as that of the prior embodiments. In addition, an annular portion 65 between beveled surfaces 62 and 63 may be surfaced with "Scotch-Lite" type reflecting tape or any equivalent type of reflecting tape, for purposes of aligning a beam which is grossly misaligned from the center, as described hereinbelow.

In operation of the embodiment illustrated in FIGS. 6A and 6B, when the laser beam is directed onto the reflective surface 62, but not centered on the target, the beam is reflected radially to the perimeter reflector edge 63, producing a bright spot on the outer edge at an angle such as to indicate the angular direction of misalignment. As the beam is brought nearer to the center of the target, the light reflected from surface 63 expands in an arc. If the beam is smaller than the diameter of opening 64, the reflected light will disappear when the beam is precisely centered, and no reflection will be seen. If the beam is larger than the diameter of opening 64, upon precise centering the outer reflecting surface 63 will appear as a bright, continuous ring of light. If the beam is sufficiently badly misaligned that it does not strike the center reflecting ring 62, then the beam will be visible on the "Scotch-Lite" surface, thus providing an indication of the misalignment.

From the above description, it is seen that the means for re-directing, e.g., reflecting, scattering, or refracting, the light transmitted from the source, may take various embodiments. The invention, as claimed hereinbelow, is not limited to any specific re-directing means for redirecting the incident light to the peripheral indicator portion of the target. Similarly, the peripheral indicating means for directing light back toward the source may take any of the desired forms as shown in the drawings and described hereinabove, or equivalents thereof.

I claim:

1. Target apparatus for providing an indication of alignment of a collimated light beam thereon, comprising a disc of translucent material having a beveled annular surface around the center thereof, and a plurality of light indicators responsive to received light uniformly spaced around the periphery of said disc, said indicators being positioned so that each receives light from said beveled surface when said beam strikes a portion of said beveled surface radially aligned therewith.

2. The apparatus as described in claim 1, wherein said indicators are passive.

3. The apparatus as described in claim 2, wherein said disc has an opening at the center thereof, and said beveled surface is a 45° counterbore.

4. The apparatus as described in claim 3, wherein said indicators are light-diffusing plugs.

5. The apparatus as described in claim 3 wherein said translucent material is an acrylic.

6. The apparatus as described in claim 3 wherein said indicators comprise optical fibers.

7. The apparatus as described in claim 1, wherein said indicators comprise openings in said disc.

8. The apparatus as described in claim 7, having active sensing devices positioned in at least some of said openings, which devices generate electrical signals upon sensing the receipt of light.

9. Target apparatus for providing an indication of alignment of a collimated light beam incident thereon, comprising:
 a. a disc;
 b. means for re-directing said incident light beam toward the periphery of said disc, said re-directing means being annular and positioned about the center of said disc;
 c. indicator means positioned peripherally about said disc to receive light from said re-directing means and direct light back toward the source of said incident beam, said indicator means being generally annular and concentric with said re-directing means; and
 d. said re-directing means and said indicator means being functionally cooperative such that said indicator means indicates the angular position of the incident light upon said disc.

10. The apparatus as described in claim 9 wherein said re-directing means is a counterbore.

11. The apparatus as described in claim 9 wherein said re-directing means is conical in form.

12. The apparatus as described in claim 9 wherein said indicator means comprises a plurality of discrete indicator elements spaced uniformly around the periphery of said disc.

13. The apparatus as described in claim 9 wherein said indicator means is continuous around said disc periphery.

* * * * *